United States Patent [19]
Kuziemka

[11] Patent Number: 5,955,149
[45] Date of Patent: Sep. 21, 1999

[54] METHOD AND COMPOSITION FOR PRODUCING A RELEASE COATING ON A BAKEWARE SUBSTRATE

[75] Inventor: Edmund J. Kuziemka, Naperville, Ill.

[73] Assignee: Material Sciences Corporation, Elk Grove Village, Ill.

[21] Appl. No.: 08/863,287

[22] Filed: May 23, 1997

[51] Int. Cl.$^6$ .................................. B05D 5/08; B05D 1/36
[52] U.S. Cl. ..................... 427/407.1; 427/386; 427/387; 427/410; 522/99; 525/65; 525/474; 523/427; 523/436; 528/26
[58] Field of Search .................................. 427/409, 387, 427/407.1, 379, 386, 410, 388.1; 525/63, 65, 118, 474; 522/99; 528/26; 523/407, 412, 411, 427, 436

[56] References Cited

U.S. PATENT DOCUMENTS

| | | | |
|---|---|---|---|
| 3,786,015 | 1/1974 | Merrill . | |
| 3,819,567 | 6/1974 | Swanson et al. | 260/42.28 |
| 3,884,868 | 5/1975 | Trice et al. | 260/37 N |
| 4,028,339 | 6/1977 | Merrill | 260/46.5 R |
| 4,066,817 | 1/1978 | De Rossi | 428/339 |
| 4,123,401 | 10/1978 | Berghmans et al. | 260/29.6 F |
| 4,204,021 | 5/1980 | Becker | 427/409 |
| 4,223,069 | 9/1980 | Berghmans | 428/324 |
| 4,262,043 | 4/1981 | Wald | 427/387 |
| 4,311,755 | 1/1982 | Rummel | 428/312.6 |
| 4,313,988 | 2/1982 | Koshar et al. | 427/387 |
| 4,369,279 | 1/1983 | Emerick | 524/267 |
| 4,522,961 | 6/1985 | Martino et al. | 523/407 |
| 4,537,800 | 8/1985 | Kuziemka | 427/327 |
| 4,544,692 | 10/1985 | Kuziemka | 524/361 |
| 4,585,705 | 4/1986 | Broderick et al. | 427/387 |
| 4,640,967 | 2/1987 | Eckberg | 528/26 |
| 4,677,121 | 6/1987 | Swihart et al. | 524/268 |
| 4,683,273 | 7/1987 | Bode | 523/412 |
| 4,684,577 | 8/1987 | Coq | 428/447 |
| 4,895,766 | 1/1990 | Saad | 428/447 |
| 5,051,470 | 9/1991 | Woo et al. | 523/411 |
| 5,079,398 | 1/1992 | Kuziemka et al. | 219/10.55 E |
| 5,085,907 | 2/1992 | Smith | 428/40 |
| 5,128,389 | 7/1992 | Inukai et al. | 522/172 |
| 5,139,826 | 8/1992 | Kuziemka et al. | 427/380 |
| 5,145,898 | 9/1992 | Narula et al. | 524/310 |
| 5,380,585 | 1/1995 | Ogawa et al. | 428/333 |
| 5,486,421 | 1/1996 | Kobayashi | 428/421 |
| 5,527,578 | 6/1996 | Mazurek et al. | 427/387 |
| 5,554,681 | 9/1996 | Patel | 524/506 |
| 5,667,891 | 9/1997 | Batzar et al. | 427/409 |
| 5,714,305 | 2/1998 | Teng et al. | 427/208.2 |

OTHER PUBLICATIONS

Tech. Bulletin No. II–6, Sep. 1967, Nat'l. Coil Coaters Assn., "Test Method for Measurement of Impact Resistance of Painted Aluminum, Steel and Galvanized Steel".

Tech. Bulletin No. II–18, Nat'l. Coil Coaters Assn., "Specification for Conducting a Solvent Hand Rub Test". (No date).

Eight page brochure entitled "Shell Resins –EPON Resin 828", dated Jun. 1995, Shell Chemical Company.

Product data sheet entitled, "Hardener HT 9506", dated 1990, CIBA–GEIGY Corporation. (No month).

One page Technical Summary Chart, highlighting EPON Resin 58005, Shell Chemical Company, undated.

Brochure entitled "BF Goodrich–Improving Epoxy Resins–Amine Cure Study Hycar® RLP", pp. 1–14, The BF Goodrich Co., Jun. 1982.

Material Safety Data Sheet for "Hardener HT 9506", CIBA–GEIGY Corporation, undated.

Versamid® Polyamide Resins, Genamid® Amidoamine Resins–Product Information, pp. 3–4. (No Date).

Product data sheet on "Hycar® Reactive Liquid Polymers", BF Goodrich Specialty Chemicals, dated May 1994.

Brochure entitled "Amine Systems", pp. 47–50, undated.

Araldite® GY 508 In Coatings and Floorings–Flexible Liquid Epoxy Resin, Ciba–Geigy Corporation, 1995. (No month).

Araldite® GT 7074–Solid "Type 5½" Epoxy Resin, Ciba–Geigy Corporation, Oct. 6, 1995.

Araldite® GZ 471 X–75, GZ 571 KX–75 and GZ 571 T–75, Ciba–Geigy Corporation, May 3, 1995.

Product specifications sheet for EPON® Resin 872–X–75, Shell Chemical Company, May, 1962.

Technical Bulletin for EPON® Resin 1004, Shell Chemical Company, undated.

General description and handling bulletin for EPON® Resins 1001 and 1001F, Shell Chemical Company, undated.

Material Safety Data Sheet for Acryloid® AT–81 Resin, Rohm and Haas Company, dated Oct. 15, 1992.

Introduction page to a bulletin for EPON® Resins, EPI–REZ® Waterborne Resins and EPI–CURE® Curing Agents, etc., Shell. (No date).

Information About Silicone Resins, Dow Corning® 1–0543 Resin, Dow Corning, 1994. (No month).

Standard Test Method for Coating Flexibility of Prepainted Sheet D4145–83, Book of ASTM Standards, vol. 06.01, Jul. 1983.

Standard Test Method for Film Hardness by Pencil Test D3363–74 Book of ASTM Standards, Nov. 1974.

*Primary Examiner*—Diana Dudash
*Attorney, Agent, or Firm*—Emrich & Dithmar

[57] ABSTRACT

A release coating composition and a method of forming a release coating on a bakeware substrate using the coating composition is provided. The release coating composition includes (i) an acrylic resin, (ii) an epoxy resin, and (iii) a silicone release agent. The release coating composition can be formed in two parts, a base coat composition and a top coat composition. The base coat composition may include an epoxy resin, an acrylic resin, a color additive and appropriate solvents. The top coat composition may include an acrylic resin, an epoxy resin, a silicone release agent, a silicone resin and appropriate solvents. Each of the parts can be separately applied to the bakeware substrate and heated to form a release coating. In some cases, the top coat composition alone may only be applied if fabrication of the coated substrate will not be severe.

18 Claims, No Drawings

METHOD AND COMPOSITION FOR PRODUCING A RELEASE COATING ON A BAKEWARE SUBSTRATE

BACKGROUND OF THE INVENTION

1. Field of the Invention

This invention relates to release coating compositions and methods for forming a release coating for bakeware by utilizing these compositions, and in particular to coating compositions useful for coil coating.

2. Description of the Prior Art

Release coating compositions to form release coatings for bakeware for providing easy removal of food from bakeware are not new. Many of these coating compositions are epoxy resin based. The method of making these resins has recently changed and a new catalyst has been employed. Some epoxy resins made with this new catalyst are no longer FDA approved, thereby eliminating release coating composition formed by these epoxy resins from use with bakeware and creating the need for new coating compositions that are safe for bakeware use.

SUMMARY OF THE INVENTION

It is a general object of the invention to provide an improved release coating composition which avoids the disadvantages of prior compositions while affording additional operational advantages.

An important feature of the invention is the provision of a release coating composition which can form a coating on a bakeware substrate that does not pose any human health risk.

Yet another feature of the invention is the provision of a release coating composition of the type set forth which can be economically applied to and cured on a substrate.

Certain features of the invention are attained by providing a release coating composition and a method of forming a coating on a bakeware substrate using the release coating composition. The release coating composition includes an acrylic resin, an epoxy resin and a silicone release agent.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PREFERRED EMBODIMENT

The release coating composition of the present invention includes a binder which has an acrylic resin and an epoxy resin and a silicone release agent.

The release coating composition is preferably made in two parts, a base coat composition and a top coat composition.

The base coat composition includes an acrylic resin and an epoxy resin.

The acrylic resin may be an acrylic resin having carboxyl functionality. A preferred acrylic resin is one sold by Rohm & Haas under the tradename Acryloid AT-81 Resin. The Acryloid AT-81 resin is a solution that is approximately 55.5% by weight acrylic polymer or resin having an average molecular weight of 45,000.

The base coat composition also includes an epoxy resin. The epoxy resin typically has terminal epoxy groups. A preferred epoxy resin is that sold in solution by Shell under the tradename EPON 872-X-75. The EPON 872-X-75 is a 75% by weight EPON 872 epoxy resin in a xylene solvent solution. EPON 872 is a dimer fatty acid modified epoxy resin having an epoxide equivalent weight of between about 650 to about 750, an average molecular weight of about 1400 and a viscosity of between about 1500 to about 2500 cP at 25° C.

Another preferred epoxy is that sold by Ciba-Geigy under the tradename Araldite GY 508. Araldite GY 508 is a bisphenol-based epoxy resin blended with a polyglycol diepoxide. Araldite GY 508 is a low viscosity, solvent free flexible epoxy resin having an epoxide equivalent weight of about 390 to about 425, a viscosity of about 2000 to about 5000 cP at 25° C.

Additional useful epoxy resins include those sold by Shell under the tradenames EPON 1001X75, EPON 1001CX75, EPON 1004X75, and those sold by Ciba-Geigy under the tradenames Araldite GZ 471X75, Araldite GZ 571KX75 and Araldite GT 7074.

Any of the above epoxy resins may be used alone or in combination as long as the total solids content of the epoxy resin is in the range of between about 20 to about 30 wt. % of the total solids content of the epoxy and acrylic resin.

EPON 1001 CX75 is an epoxy resin solution. It is a 75% by weight of EPON 1001 epoxy resin in a solvent that is a blend of 65% methylisobutylketone and 35% xylene. The EPON 1001 resin is derived from bisphenol A and epichlorohydrin has an epoxide equivalent weight of between about 450 to about 550, an average molecular weight of about 1000, a hydroxyl content per 100 gram resin of 0.25, an esterification equivalent weight (gms. resin to esterify one mole acid) of about 145, and a viscosity (Gardner-Holt) of Y–Z @ 25° C.

EPON 1001X75 is an epoxy resin solution that is 75% by weight of EPON 1001 in a xylene solvent.

EPON 1004X75 is an epoxy resin solution. It is 75% by weight EPON 1004 epoxy resin in xylene. EPON 1004 resin is derived from the reaction of epichlorohydrin and bisphenol A and has an epoxide equivalent weight of between about 850 to about 975, an esterification equivalent weight of 175 and average molecular weight of between about 1800 to about 1900.

Araldite GZ 471X75 is a 75% by weight solution of Araldite GZ 471 epoxy resin in xylene. Araldite GZ471 has an epoxide equivalent weight of 450 to about 530, a Gardner-Holt viscosity of $Z_3$–$Z_5$ at 25° C. Araldite GZ 471 is a solid, unmodified bisphenol A epoxy resin.

Araldite GZ 571KX75 is a 75% by weight solution of Araldite GZ 571 epoxy resin in a 65/35% methylisobutylketone/xylene blend. Araldite GZ 571 has an epoxide equivalent weight of 450 to about 530, a Gardner-Holt viscosity of $Z_1$–$Z_4$ at 25° C. Araldite GZ 571 is a solid, unmodified bisphenol A epoxy resin.

Araldite GT7074 is a flaked solid, unmodified bisphenol A-based epoxy resin having an epoxide equivalent weight of between about 935 to about 1175 and an ICI viscosity at 175° C. of between about 3000 to about 6000 cP.

The base coat composition may also include a color additive such as a black tint paste, or an aluminum paste, such as that sold by Reynolds Metal under the designation 6-234 or any other color additive safe for food contact.

The base coat composition may also include appropriate solvents including as isophorone, butyl cellosolve, butanol and SC150. SC150 is an aromatic solvent having a boiling point between 360 and 410° F. The solvents should have a boiling point less than the temperature used to cure the base coat composition.

The top coat composition includes an acrylic resin, epoxy resin and a silicone release additive.

The acrylic resin is preferably Acryloid AT-81, discussed above.

Preferably, the epoxy resin of the top coat composition is EPON 1001CX75. Other epoxy resins, however, may be used, including those used for the base coat composition. The epoxy resins can be used alone or in combination, as long as the solids content of the epoxy resin is in the range of between about 20 to about 30 wt. % of the total solid content of the epoxy and acrylic resins.

The top coat composition may also include a silicone resin having hydroxyl or silanol functionality. A preferred silicone resin is one sold by Dow Corning under the tradename Dow Corning 1-0543 Resin. This resin is a phenyl methyl silicone resin with silanol functionality of 5% by weight. Its molecular weight is in the range of about 2000 to about 4000. Preferably this resin is dissolved in SC100 to 70% solids by weight. The 1-0543 resin may be dissolved in other solvents, such as ketones, aromatics such as SG150 or xylene, or oxygenated solvents such as butylcellosolve. The silicone resin is believed to react with the acrylic resin to provide further heat resistance to the finished coating. The silicone resin can comprise about 10–15 wt. % of the total solids of the acrylic and epoxy resin solids.

The top coat composition also includes a silicone release agent, such as a siloxane resin. A preferred silicone release agent is a silanol end blocked, polydimethyl siloxane release additive sold by Dow Corning under the trade name Dow Corning 1-9770 Resin and having a molecular weight of about 26,000. Other silicone release agents are the siloxane resins disclosed in U.S. Pat. No. 4,326,279 issued on Jan. 18, 1983 to Emerick and U.S. Pat. No. 3,786,015, issued on Jan. 15, 1974 to Merrill, the disclosures of which are incorporated herein by reference. The silicone release agent preferably is in the range of about 3 to about 10 wt. % of the total solids of the top coat composition. The silicone release agent imparts non-stick qualities to the finished coating.

The top coat composition may also include various solvents, such as those described for the base coat composition.

The two-part (or two coat) coating composition for forming a release coating is typically formed and applied to a metal bakeware substrate, such as coiled rolls of aluminum, cold roll steel or tin-free steel, in a two layer preferably continuous process, as follows.

The components of the base coat composition are combined and mixed to form the base coat composition and the components of the top coat composition are combined and mixed to form the top coat composition. The base coat composition is applied first to an uncoiled portion of the coiled metal substrate by conventional means, such as roll coating, or the like. The coated substrate is then heated above the boiling point of the solvents. This heating evaporates the solvents and causes the terminal epoxy groups of the epoxy resin to react with the carboxyl groups of the acrylic resin to form a thin, flexible base coat layer on the substrate. The coated substrate is then cooled by water quenching. The top coat composition is then applied by conventional means, such as roll coating, or the like, over the thin base coat layer. The two layer coated substrate is then heated above the boiling point of the solvents of the top coat composition. This heating evaporates the solvents of the top coat composition and causes the epoxy groups of the epoxy resins and hydroxyl groups of the silicone resin to react with the carboxyl groups of the acrylic resin to form a top coat layer. Also, unreacted epoxy groups from the epoxy resin from the base coat layer and unreacted carboxyl groups from the acrylic resin of the base coat layer can react with the components of the top coat composition to bond the top coat layer to the base coat layer. The two-layer coated substrate is then cooled, such as by water quenching, and rolled into a coil.

The coated coil roll can then be cut and fabricated into bakeware having food release properties.

Depending on the circumstance, the release coating composition may be made in one part and applied in one layer.

EXAMPLE

A two part release coating composition was formed having the following components:

| Component | Weight (lbs.) | Volume (gals.) | Solids Weight (lbs.) | Solids Volume (gals.) |
|---|---|---|---|---|
| Base Coat Composition | | | | |
| Acryloid AT-81 | 433 | 50.91 | 238.2 | 24.68 |
| Isophorone | 30 | 3.91 | | |
| EPON 872-X-75 | 108 | 12.71 | 81.0 | 9.00 |
| Butyl Cellosolve | 30 | 4.00 | | |
| Butanol | 32 | 4.74 | | |
| SC150 | 128 | 17.30 | | |
| Aluminum paste | 32 | 1.21 | 20.8 | 0.42 |
| Reynolds Metal 6-234 SC150 | 14.9 | 2.01 | | |
| TOTAL | 807.9 | 103.00 | 340.0 | 34.10 |
| Top Coat Composition | | | | |
| Acryloid AT-81 | 420 | 49.41 | 231 | 23.94 |
| Isophorone | 30 | 3.91 | | |
| Butanol | 24 | 3.56 | | |
| EPON 1001-CX-75 | 100 | 10.99 | 75 | 7.98 |
| 70% Dow Corning 1-0543 resin in SC100 | 60 | 6.98 | 42 | 4.20 |
| SC150 | 188.5 | 25.47 | | |
| Dow Corning 1-9770 Resin | 22 | 2.68 | 22 | 2.20 |
| TOTAL | 844.5 | 103.00 | 370.0 | 38.32 |

The above components of the base coat composition were mixed together and applied to an uncoiled portion of a coiled 0.15 inch thick tin free steel roll by roll coating, or the like, and then heated to a peak metal temperature between 490–510° F. for 15–20 seconds to form a 0.2 to 0.3 mil thick flexible film base coat layer. The coated substrate was then cooled by water quenching.

The above components of the top coat composition were then mixed and applied by roll coating, or the like, over the water-quenched 0.2 to 0.3 mil base coat layer. The two-layer coated substrate was then heated for about 35 seconds at a peak metal temperature wherein 480–500° F. to form a 0.2 to 0.3 mil top coat layer forming a total film thickness of between about 0.4 to 0.6 mil. The coated substrate was then cooled by water quenching and rolled into a coil.

Portions of the finished coated substrate were then tested with the following results:

A) Hardness (ASTM D3363-74-Eagle Tourquoise Lead)—H

B) Flexibility (ASTM D4145-83)—OT

C) Methylethyl ketone hand rub resistance test (National Coil Coaters Assn. Test II-18)—55 double rubs no coating is removed (rubbing stopped after 55 rubs)

D) Draw (3½"×3½" piece of coated substrate drawn with 1" square mandrel)—1½ inches without fracture or delamination of coating E) Impact Resistance (National Coil Coaters Assn. Test No. II-6, 4 lb. weight, ¾ inch diameter round head, coated side)—90 inch-pounds without delamination or cracking While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A liquid release coating composition comprising:
   an acrylic resin;
   an epoxy resin;
   a silicone release agent;
   wherein the solids content of acrylic resin is in the range of from about 70 to about 80 wt. % of the total solids content of the epoxy and acrylic resins.

2. The composition of claim 1, and further comprising a silicone resin.

3. The composition of claim 2, and further comprising a color additive.

4. The composition of claim 2, wherein the silicone resin is a phenyl/methyl silicone resin with silanol functionality.

5. The composition of claim 1, wherein the epoxy resin has an epoxide equivalent weight in the range of between about 390 to about 1175.

6. The composition of claim 1, wherein the epoxy resin has an epoxide equivalent weight of less than about 750.

7. A method for forming a release coating on a bakeware substrate, comprising:
   mixing a first set of components together to form a base coat composition, the first set of components including an acrylic resin and an epoxy resin;
   applying the base coat composition to the bakeware substrate to form an intermediate coated substrate;
   heating the intermediate coated substrate to cure the base coat composition to form a base coat layer on the substrate, the curing of the base coat composition including reacting the epoxy resin with the acrylic resin;
   mixing a second set of components to form a top coat composition, the second set of components including an acrylic resin, an epoxy resin and a silicone release agent;
   applying the top coat composition to the base coat layer to form a second intermediate coated substrate; and
   heating the second intermediate coated substrate to cure the top coat composition and bond the top coat composition to the base coat layer, the curing of the top coat composition including reacting the epoxy resin with the acrylic resin.

8. The method of claim 7, wherein the first set of components further includes a color additive.

9. The method of claim 7, wherein the solids content of epoxy resin of the first set of components is in the range of between 20 to about 30 wt. % of the total solids content of the epoxy and acrylic resin of the first set of components.

10. The method of claim 7, wherein the solids content of epoxy resin of the second set of components is in the range of between 20 to about 30 wt. % of the total solids content of the epoxy and acrylic resin of the second set of components.

11. The method of claim 8, wherein the second set of components further includes a silicone resin.

12. The method of claim 11, wherein the silicone resin is a phenyl/methyl silicone resin with silanol functionality.

13. The method of claim 7, wherein the bonding of the top coat composition and the base coat composition includes respectively reacting the epoxy and acrylic resins of the top coat composition with the acrylic and epoxy resins of the base coat.

14. A method for forming a release coating on a bakeware substrate, comprising:
   mixing a set of components together to form a coating composition, the composition including an acrylic resin, and epoxy resin and a silicone release agent;
   applying the coating composition to the bakeware substrate to form a coated substrate; and
   heating the coated substrate to cure the coating composition to form a coating layer on the substrate, the curing of the coating composition including reacting the epoxy resin with the acrylic resin.

15. The method of claim 14, wherein the coating composition includes a color additive.

16. The method of claim 14, wherein the solids content of epoxy resin of the coating composition is in the range of between 20 to about 30 wt. % of the total solids content of the epoxy and acrylic resins of the coating composition.

17. The method of claim 14, wherein the coating composition further includes a silicone resin.

18. The method of claim 17, wherein the silicone resin is a phenyl/methylsilicone resin with silanol functionality.

* * * * *

UNITED STATES PATENT AND TRADEMARK OFFICE
CERTIFICATE OF CORRECTION

PATENT NO : 5,955,149

DATED : Sep. 21, 1999

INVENTOR(S) : Kuziemka, Edmund J.

It is certified that error(s) appear in the above-identified patent and that said Letters Patent are hereby corrected as shown below:

Add to references --Product information sheet entitled "EPODIL® 748 Reactive Diluent", Pacific Anchor Chemical Corporation, 1989.--

Signed and Sealed this

Tenth Day of April, 2001

*Attest:*

NICHOLAS P. GODICI

*Attesting Officer*   *Acting Director of the United States Patent and Trademark Office*